(12) United States Patent
Johnsson et al.

(10) Patent No.: US 9,797,312 B2
(45) Date of Patent: Oct. 24, 2017

(54) SUPPORTING STRUCTURE FOR A GAS TURBINE ENGINE

(75) Inventors: Goran Johnsson, Uddevalla (SE); Rickard Samuelsson, Trollhattan (SE)

(73) Assignee: GKN Aerospace Sweden AB, Varnersborg (SE)

( * ) Notice: Subject to any disclaimer, the term of this patent is extended or adjusted under 35 U.S.C. 154(b) by 220 days.

(21) Appl. No.: 14/397,664

(22) PCT Filed: May 2, 2012

(86) PCT No.: PCT/SE2012/000062
§ 371 (c)(1),
(2), (4) Date: Oct. 29, 2014

(87) PCT Pub. No.: WO2013/165281
PCT Pub. Date: Nov. 7, 2013

(65) Prior Publication Data
US 2015/0176494 A1 Jun. 25, 2015

(51) Int. Cl.
*F02C 7/20* (2006.01)
*F01D 9/06* (2006.01)
(Continued)

(52) U.S. Cl.
CPC .............. *F02C 7/20* (2013.01); *F01D 9/065* (2013.01); *F01D 25/162* (2013.01); *F02C 6/08* (2013.01);
(Continued)

(58) Field of Classification Search
CPC ...... F02C 6/06; F02C 6/08; F02C 7/20; F02C 7/18; F02C 7/143; F01D 9/065;
(Continued)

(56) References Cited

U.S. PATENT DOCUMENTS 2,682,363 A * 6/1954 Lombard .............. F04D 29/542
415/115
3,365,124 A * 1/1968 Burge .................. F04D 29/542
415/115
(Continued)

FOREIGN PATENT DOCUMENTS

WO         9504225 A1     2/1995

OTHER PUBLICATIONS

International Preliminary Report on Patentability with Written Opinion for PCT/SE2012/000062 dated Nov. 4, 2011 (8 pages).
(Continued)

*Primary Examiner* — William H Rodriguez
*Assistant Examiner* — Kyle Thomas
(74) *Attorney, Agent, or Firm* — Bejin Bieneman PLC

(57) ABSTRACT

A supporting structure for a gas turbine engine includes an inner ring, an outer ring, and a plurality of circumferentially spaced, load carrying radial elements connecting the inner and outer rings. The radial elements have an airfoil shape with a leading edge directed towards the inlet side of the supporting structure, a trailing edge directed towards the outlet side of the supporting structure, and two opposite sides connecting the leading edge and the trailing edge. At least one of the radial elements includes a gas passage arrangement configured to lead a separate bleeding gas flow from the supporting structure. The gas passage arrangement includes a radially extending gas channel arranged inside the radial element and at least one opening in communication with the gas channel. The at least one opening is arranged at one of the two opposite sides of the radial element.

12 Claims, 7 Drawing Sheets

(51) Int. Cl.
*F01D 25/16* (2006.01)
*F02C 6/08* (2006.01)
*F04D 29/54* (2006.01)

(52) U.S. Cl.
CPC ...... *F04D 29/542* (2013.01); *F05D 2240/121* (2013.01); *Y02T 50/671* (2013.01)

(58) Field of Classification Search
CPC . F01D 9/41; F01D 5/18; F01D 25/162; F01D 25/12; F01D 25/125; F01D 25/14; F01D 25/183; F01D 25/22; F05D 2240/121; F05D 2260/20; F05D 2260/607
See application file for complete search history.

(56) References Cited

U.S. PATENT DOCUMENTS

| | | | |
|---|---|---|---|
| 6,622,475 B2 | 9/2003 | Brault et al. | |
| 7,200,999 B2 * | 4/2007 | Bagnall | B64C 21/06 60/226.1 |
| 2006/0051199 A1 * | 3/2006 | Guemmer | F01D 5/143 415/144 |
| 2010/0150700 A1 * | 6/2010 | Strecker | F01D 9/065 415/116 |
| 2010/0275614 A1 * | 11/2010 | Fontaine | F01D 25/162 60/797 |

OTHER PUBLICATIONS

International Search Report and Written Opinion dated Jan. 25, 2013 (12 pages).

\* cited by examiner

FIG. 4 A-A

SUPPORTING STRUCTURE FOR A GAS TURBINE ENGINE

CROSS-REFERENCE TO RELATED APPLICATIONS

This application is a national stage of International Application No. PCT/SE2012/000062 filed on May 2, 2012, which prior international application is hereby incorporated herein by reference in its entirety.

TECHNICAL FIELD

This disclosure relates to a supporting structure for a gas turbine engine, said structure comprising an inner ring, an outer ring, and a plurality of circumferentially spaced, load carrying radial elements connecting the inner and outer rings, said radial elements being configured to transfer loads between the inner ring and the outer ring. In particular, the disclosure relates to leading of bleed air/gas through a radial element of such a structure, and also to a gas turbine engine comprising such a supporting structure.

BACKGROUND

An axial flow gas turbine engine, such as an aircraft "jet-engine", generally comprises an air inlet, a compressor section, a fuel combustion chamber, a turbine section, one or several rotatable drive shafts connecting corresponding compressors and turbines, an exhaust outlet and structures for supporting the drive shafts and for mounting the engine to, e.g., an aircraft.

The supporting structures are static parts that typically include an inner shell or ring, for connection to bearings and a centrally located drive shaft, and an outer shell or ring, for connection to, e.g., an engine casing, and where circumferentially distributed, load carrying airfoil shaped radial elements extend between and connect the inner and outer shells/rings. A primary axial gas flow through the engine thus flows through the areas formed between the rings and the elements.

It is known to bleed air/gas from gas turbine engines for generating a flow of pressurized air/gas that, for instance, can be used for pressurizing the airplane cabin or for cooling or heating purposes. As described in e.g., U.S. Pat. No. 2,986,231 and WO95/04225, a flow of bleeding air can be generated by arranging additional non-structural radial elements across the gas flow and provide these (airfoil shaped) elements with some form of internal channel that connects an inlet located at the leading edge of the radial element in the primary axial gas flow and an outlet located at an outer part of the element.

It is also known to make use of a load carrying radial element of a supporting structure for leading the flow of bleeding air. However, because the supporting structures need to be capable of transferring considerable radial loads between the drive shaft and the engine casing and therefore require radial elements that have a significant stiffness, and because channels and openings for leading bleed air generally have a negative effect on the stiffness and strength of the elements, it is more complicated to make use of structural elements than non-structural elements for generating the flow of bleeding air.

Traditionally, supporting structures of the type discussed here are produced by casting, and there are various known ways of designing casted structures where the radial elements are capable of leading a flow of bleed air while at the same time exhibiting a sufficient strength and stiffness.

The desire for low-weight products in air-craft applications has generated a need for supporting structures that are less heavy than the traditional casted structures but that still are capable of transferring radial loads, withstanding an internal pressure etc. Generally, such low-weight structures are manufactured by joining, typically by welding, a number of prefabricated parts together. The radial elements of such prefabricated structures usually consist of hollow airfoil shaped vanes. A particular problem with regard to air bleeding channels arises where the vanes are formed by welding a first part of the vane to a second part that forms an extension of the first part so that the welded cross-sectional connection becomes located somewhere along the length of the vane. A typical example is when the first vane part form part of a casted inner ring (hub) to which the remaining, outer part of the vane and the outer ring are joined. How to arrange air bleeding channels and openings in such vanes is not evident since the air bleeding system must not interfere with the welding interface or reduce the structural stiffness of the vane.

In order to increase the possibilities of making use of lighter, prefabricated supporting structures there is a desire for designs that allow air bleeding.

SUMMARY

Disclosed herein is a supporting structure and a gas turbine engine that exhibit improved bleed-off air systems for supporting structures, in particular for prefabricated, welded supporting structures.

A supporting structure for a gas turbine engine, comprises an inner ring, an outer ring, and a plurality of circumferentially spaced, load carrying radial elements connecting the inner and outer rings, said radial elements being configured to transfer loads between the inner ring and the outer ring, wherein a gas channel for a primary axial gas flow is defined between the inner and outer rings, wherein the supporting structure has an inlet side for primary gas flow entrance and an outlet side for primary gas outflow, wherein the radial elements have an airfoil shape with a leading edge directed towards the inlet side, a trailing edge directed towards the outlet side, and two opposite sides connecting the leading edge and the trailing edge, wherein the locus of points midway between the two opposite sides forms a mean camber line of each radial element, and wherein at least one of the radial elements comprises a gas passage arrangement configured to lead a separate bleeding gas flow from the supporting structure.

The gas passage arrangement comprises a radially extending gas channel arranged inside the radial element and at least one opening in communication with said gas channel, wherein the at least one opening is arranged at one of the sides of the radial element.

Placing the opening at the side of the radial element, instead of at the leading edge, has the advantage that the stiffness and strength of the element is less affected since the highest loads are transferred through the front and back portions of the element. Further, the position of the opening can be adjusted both radially and axially so as to reduce the influence of the stiffness of the element and to avoid interference with any welding interface of the element. In effect, the present supporting structure makes it easier to provide for tapped-off bleed air in prefabricated, welded supporting structures. A further effect of placing the opening at the side of the radial element is that it gives an opportunity to arrange a second bleed-off system in the same element, at least in some types of elements with a particular design that allows an additional opening to be positioned at the leading edge of the element, for instance at the opposite side of the welding interface in relation to the opening mentioned above so that the openings do not come too close to each other or to the welding interface.

In an embodiment the structure comprises an inner annular gas flow guiding member configured to define an inner radius for the primary axial gas flow, wherein the inner annular gas flow guiding member is arranged radially outwards of the inner ring, and wherein the at least one opening is arranged between the inner ring and the inner annular gas flow guiding member.

This way the opening, and thus the internal gas channel, becomes in communication with the space formed between the inner ring and the inner annular gas flow guiding member. The gas/air present in this space is more or less non-moving and is also clean compared to the outer part of the primary gas flow which makes it useful for many purposes. Further, the pressure of this gas/air is suitable for forming a flow of bleeding air through the gas channel in the element and further away.

In an embodiment the at least one opening is arranged in connection to the inner ring.

This way the effect on the stiffness is normally minimized and the distance to an element welding line located some distance from the inner ring can be reduced. Typically, "in connection" means that the opening is formed in the area between the inner ring and a lower/inner edge of a side wall of the radial element.

In an embodiment the at least one opening comprises a recession formed in the inner ring.

With this design part of the opening, or the entire opening, is formed by the recession which means that the part of the opening arranged in the side of the radial element can be reduced without reducing the total cross sectional area of the opening. In turn, this leads to a reduced effect on the mechanical properties of the element. Alternatively, the recession can be used to widen the opening (for increasing the flow of bleeding air) without widening the part of the opening arranged in the side of the vane. Combinations of these two alternatives are of course possible. Preferably, the recession extends circumferentially such as to extend somewhat on both sides of the side wall of the radial element. Further, the recession is preferably shaped so as to enhance the flow of gas/air through the opening and up/out through the element; typically the recession is rounded/bowl-shaped. The recession can be made when forming the inner ring in a casting process.

In an embodiment the at least one opening has an elongated shape, wherein the longer extension direction of the elongated shape extends along the mean camber line of the radial element.

This way the opening can be made sufficiently large without having to extend radially along the side of the element. This reduces the openings influence on the mechanical properties of the element.

In an embodiment the at least one opening is positioned at a certain minimum distance from the leading edge as well as from the trailing edge, wherein this minimum distance is 5% of the length of the mean camber line.

In an embodiment the gas channel is in communication with at least two openings arranged on opposite sides of the radial element. This provides for symmetrical mechanical properties of the element and for a large total opening area without having to make each opening too large.

In an embodiment the gas channel is in communication with at least four openings arranged on opposite sides of the radial element. Preferably, two openings are arranged at an axial distance from each other on each side of the radial element, wherein each opening is designed as defined above. This is a suitable design for at the same providing a large total opening area and a small effect on the mechanical properties of the element.

In an embodiment the structure is produced by welding at least two parts together, wherein the at least one radial element has a welding line that extends circumferentially around the radial element at a distance from the inner ring. The inventive design is particularly advantageous for such a welded structure. Preferably, the at least one opening is arranged between the welding line and the inner ring.

In an embodiment the at least one radial element comprises a second gas passage arrangement configured to lead a second separate bleeding gas flow from the supporting structure, wherein the second gas passage arrangement comprises a second radially extending gas channel arranged inside the radial element and at least one second opening in communication with said second gas channel, wherein the at least one second opening is arranged at the leading edge of the radial element. Thereby, one singe radial element can be provided with two separate bleeding gas flow systems.

A gas turbine engine may comprise a supporting structure of the above type. For example, the gas turbine engine is of an axial flow type comprising in flow series a compressor section, a fuel combustion chamber and a turbine section, wherein the supporting structure is arranged in the compressor section. Preferably, the gas turbine engine is arranged for propulsion of an aircraft.

BRIEF DESCRIPTION OF DRAWINGS

In the description given below reference is made to the following figure, in which.

DESCRIPTION OF EXAMPLE EMBODIMENTS

Figure 1:
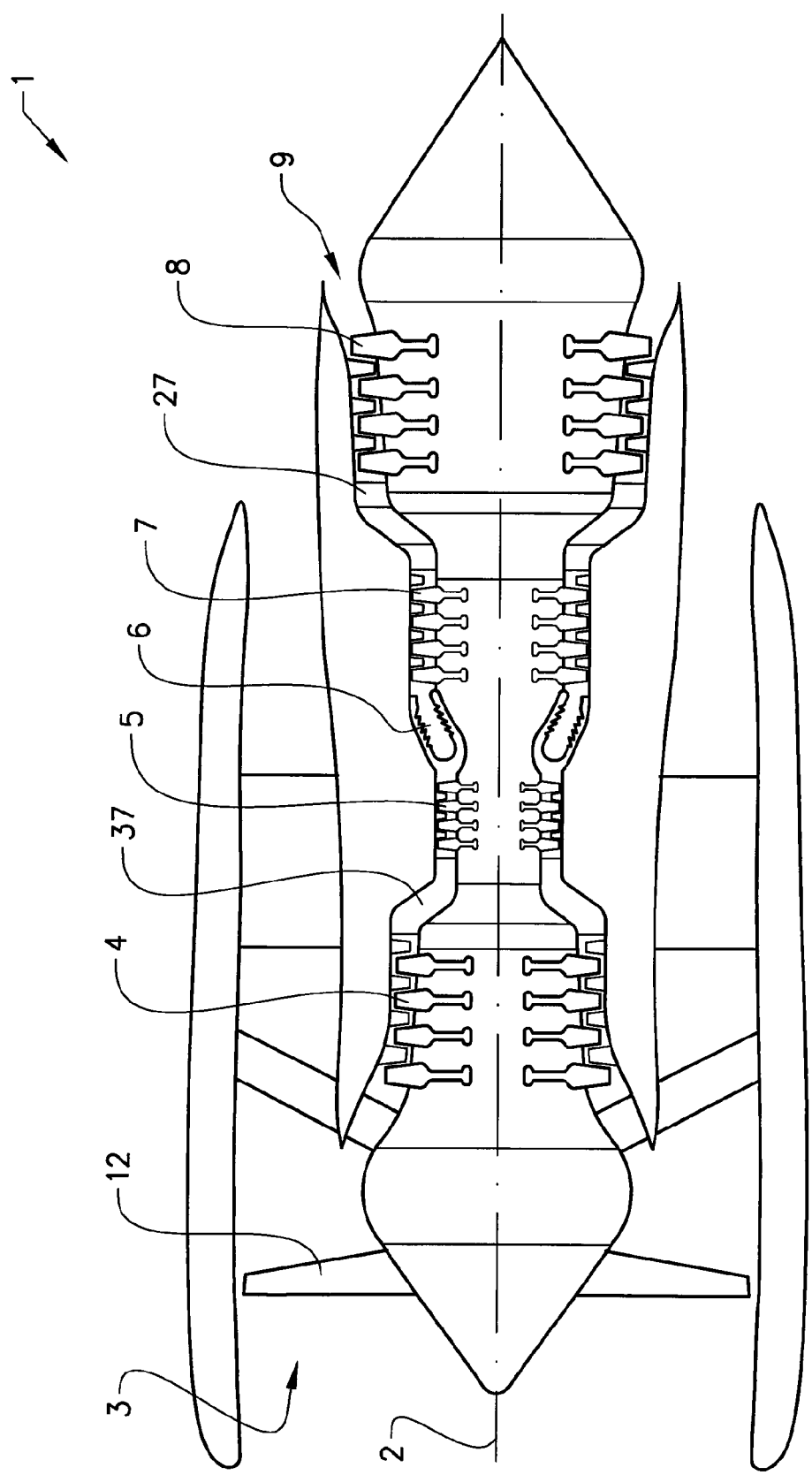
FIG. 1 shows, in a schematic overview, an axial flow aircraft gas turbine engine provided with an exemplary supporting structure.

FIG. 1 shows, in a schematic overview, an axial flow aircraft gas turbine engine 1 provided with a supporting structure 37. FIG. 1 also shows a further supporting structure 27. The engine 1 comprises still further supporting structures that are not shown.

In general, the gas turbine engine 1 shown in FIG. 1 is of conventional design and comprises, in axial flow series, an air intake 3, a low pressure compressor 4, a high pressure compressor 5, combustion equipment 6, a high pressure turbine 7, a low pressure turbine 8 and an exhaust outlet 9. During operation, the high pressure compressor 5 is driven by the high pressure turbine 7 via a first hollow shaft, the high pressure (HP) shaft (not shown). Similarly, the low pressure compressor 4 is driven by the low pressure turbine 8 via a second hollow shaft, the low pressure (LP) shaft (not shown), which is coaxially disposed within the first shaft. A fan 12 is arranged to force air into and around the gas turbine engine casing. A common axis 2 is also shown.

The gas turbine engine 1 operates, in general, in a conventional manner whereby air is drawn in through the air intake 3 and initially compressed by the fan 12 and then compressed by the low pressure compressor 4 before passing into the high pressure compressor 5 where it is further compressed. The compressed air then flows into the combustion equipment 6 where it is mixed with fuel and the mixture combusted. The resultant hot combustion products then expand through the high and low pressure turbines 7, 8 before being exhausted to the atmosphere through the exhaust outlet 9.

The front and rear supporting structures 37, 27 are normally used for supporting the drive shafts and for mounting the engine 1 to an aircraft. The front supporting structure 37 is arranged in the compressor section between the low and high pressure compressors 4, 5.

Generally, support structures in jet engines support one or several shafts by means of roller and/or ball bearings. The load is transmitted through an inner support structure to an inner hub connected to an outer structure (shroud) by means of radial "spokes". In order to reduce aerodynamic drag or to guide the gas flow these "spokes" are usually covered with an airfoil structure or made integral to the structure. Integrated airfoils or vanes are sometimes denoted "struts". In the example described below the term structural vanes is used. Structural vanes are capable of supporting both aerodynamic loads as well as a combination of structural and thermally induced loads. Most of the modern jet engines utilize such vanes in structural components, such as the supporting structure 37.

As will be described further below the supporting structure 37 is arranged to generate flow of bleeding gas away from structure 37 to other parts of the engine 1.

Figure 7:
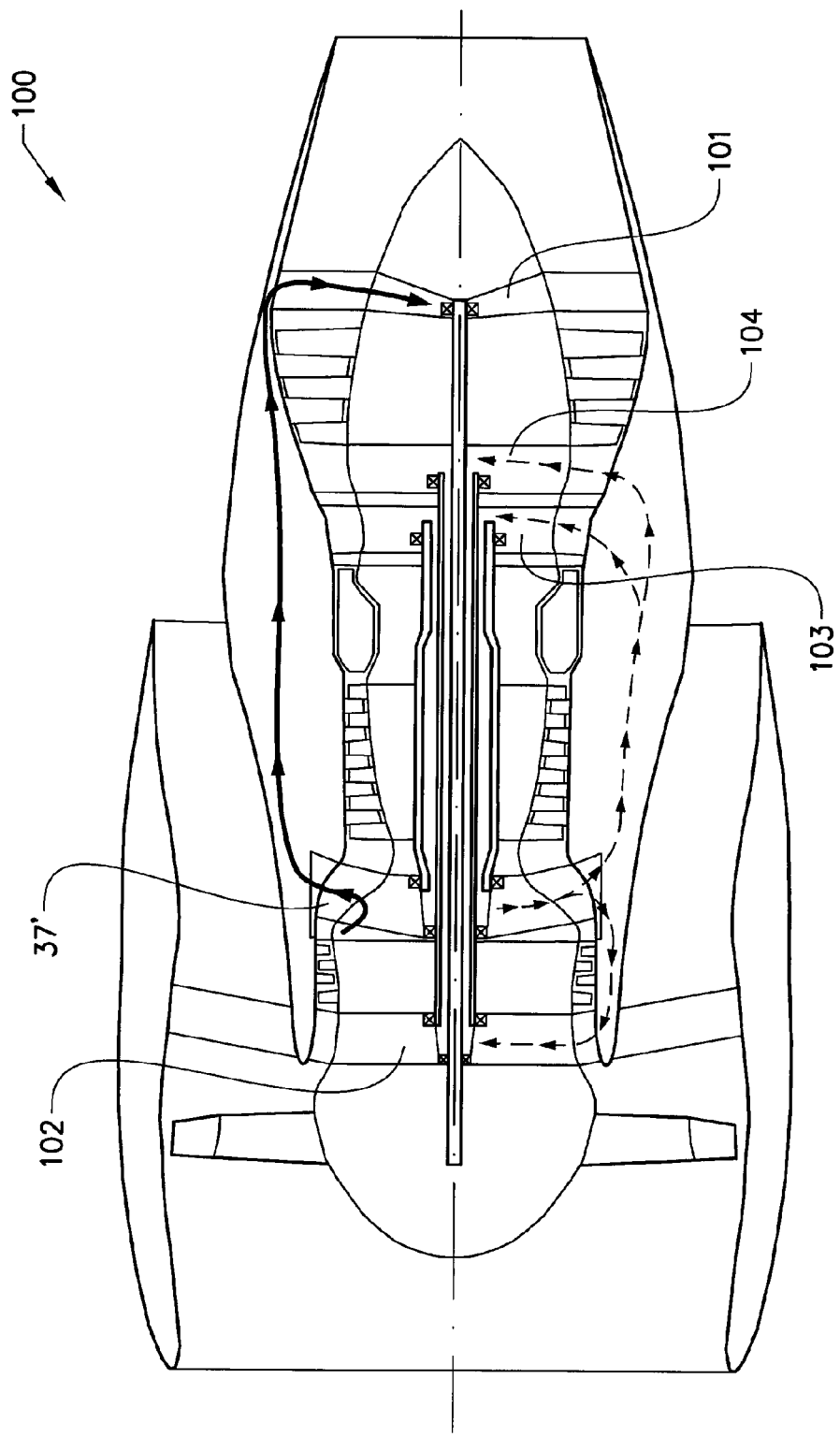
FIG. 7 shows, in a schematic overview, an example of a secondary air system using bleed air from a supporting structure.

FIG. 7 shows a sketch of another axial flow aircraft gas turbine engine 100 which in principal is similar to the engine 1 shown in FIG. 1 but has three shafts. Such a three-shafted engine 100 is also well known as such to a person skilled in the art. In this case the exemplary supporting structure 37' is arranged in the compressor section between the intermediate and high pressure compressors and forms what is commonly referred to as an intermediate compressor case, ICC.

As exemplified in FIG. 7, a secondary air system feeds bleed air (solid line) from the supporting structure 37' to a bearing compartment of a turbine rear supporting structure 101. The bleed gas may also, or instead, be fed (dashed line) to bearing compartments of a front supporting structure 102 and/or of high-, intermediate- and low-pressure supporting structures 103, 104 in the turbine section. The bleed gas may also be used for other purposes.

The supporting structure 37, 37' is particularly well adapted to be applied in the type of engine 100 shown in FIG. 7 because of the suitable pressure of the gas/air.

The supporting structure 37, 37' will now be described with reference to FIGS. 2-6. The structure 37 comprises an inner ring 10, an outer ring 11, and a plurality of circumferentially spaced, load carrying radial elements 12 in the form of structural vanes that connect the inner and outer rings 10, 11. The vanes 12 are designed to transfer loads between the inner ring 10 and the outer ring 11. An annular load transfer structure is positioned internally of the inner ring 10 for transferring loads between the vanes 12 and a bearing structure (not shown) for supporting the shaft(s) (not shown) positioned centrally in the supporting structure 37. The exemplified supporting structure 37 further comprises engine mounts (not shown) for fastening of the gas turbine engine 1 to an aircraft.

The supporting structure 37 is also provided with an inner and an outer annular gas flow guiding member 13, 14 in the form of ring-shaped walls or plates that are fixed to the vanes 12, at a distance from their end points at the inner and outer rings 10, 11, and that extend circumferentially between the inner and outer rings 10, 11. The vanes 12 can be considered to extend through the inner and outer gas flow guiding walls 13, 14. The inner gas flow guiding wall 13 is arranged radially outwards of the inner ring 10 and defines an inner radius for the primary axial gas flow. The outer gas flow guiding wall 14 is arranged radially outwards of the inner gas flow guiding wall 13 and radially inwards of the outer ring 11 and defines an outer radius for the primary axial gas flow.

Figure 2:
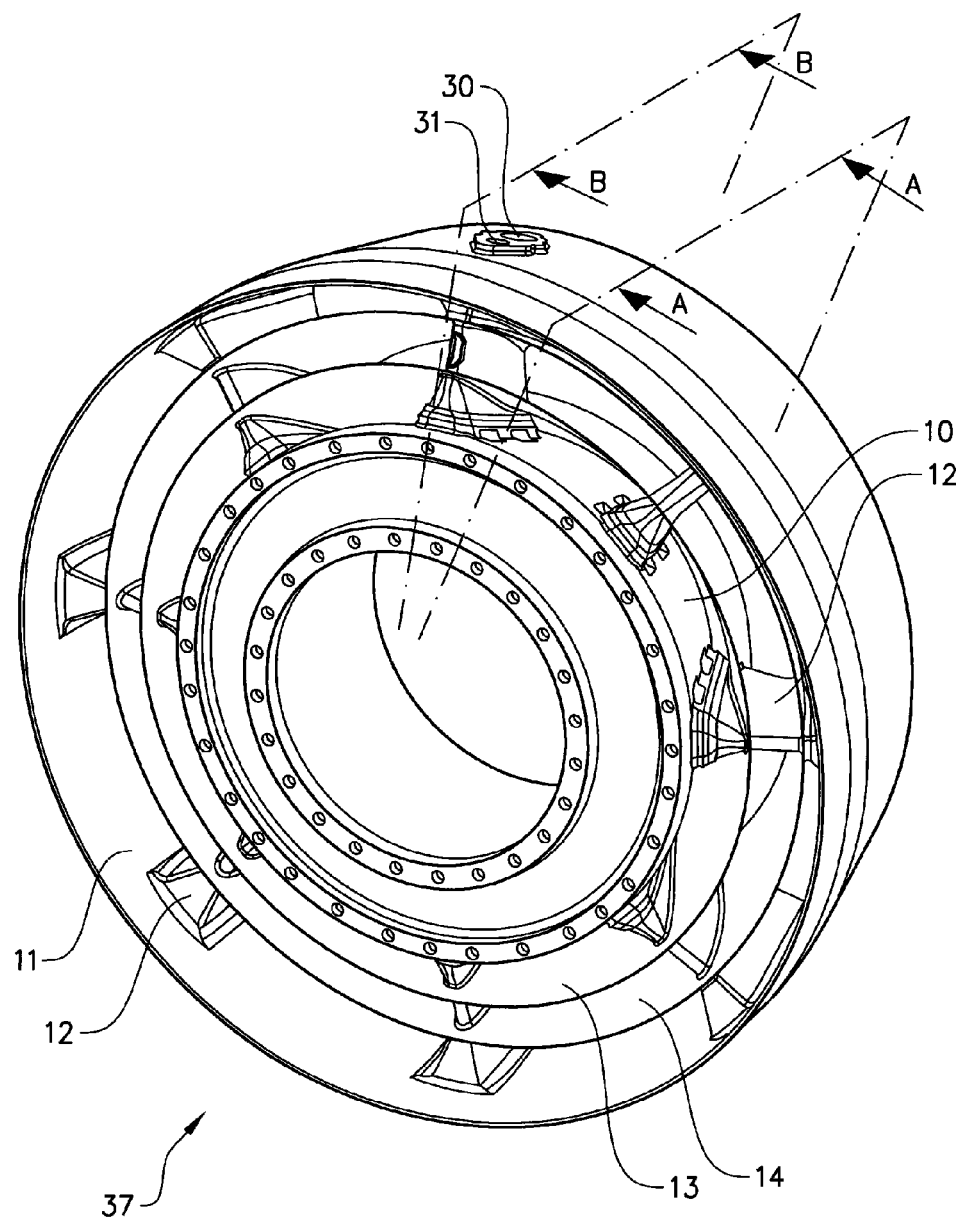
FIG. 2 shows, in a perspective front view, an embodiment of an exemplary supporting structure.
Figure 3:
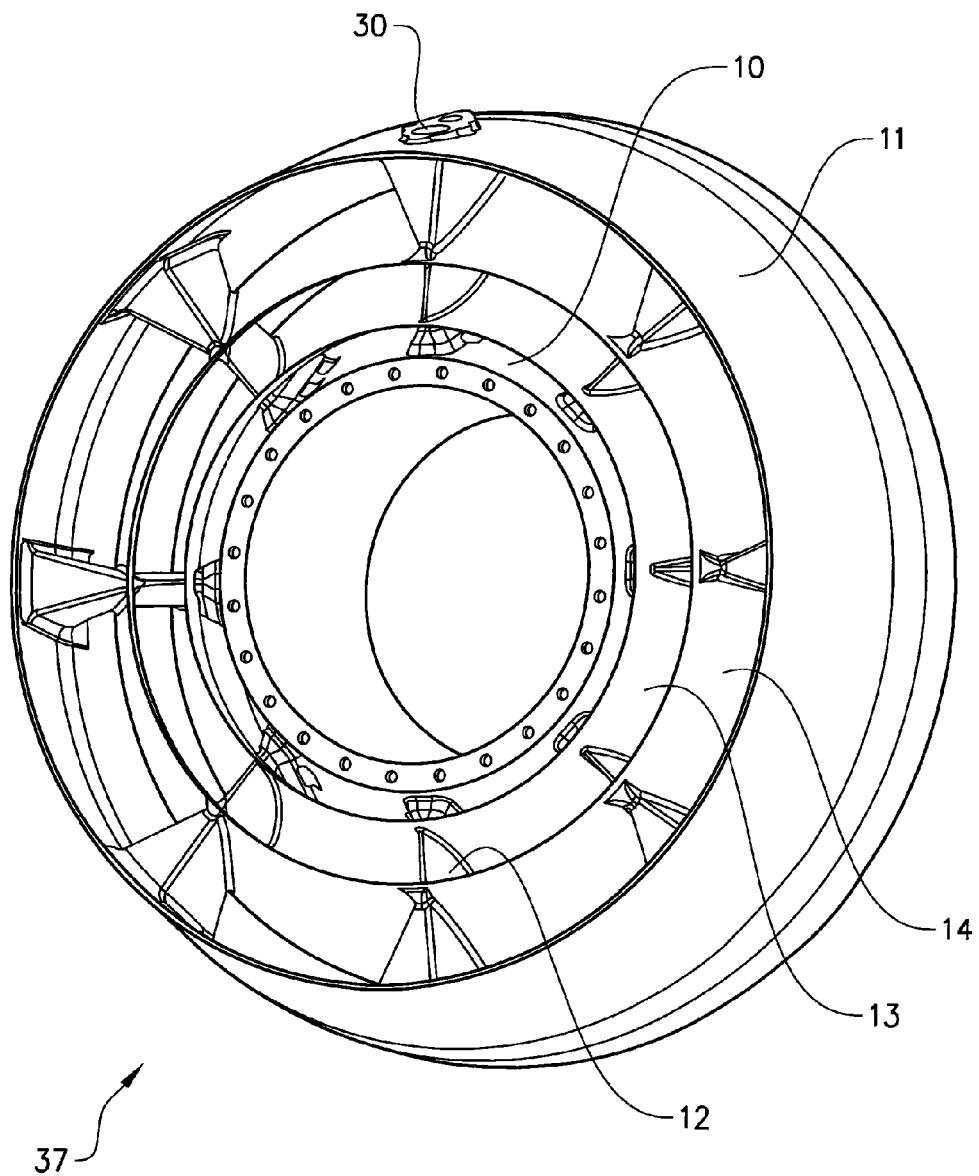
FIG. 3 shows, in a perspective rear view, the embodiment according to FIG. 2.

A gas channel for a primary axial gas flow is thus defined between the inner and outer gas flow guiding walls 13, 14 in a zone between the inner and outer rings 10, 11. Circumferentially, the gas channel for the primary axial gas flow is divided by the radially extending vanes 12. An inlet side for primary gas flow entrance to the structure 37 is shown in FIG. 2 and an outlet side for primary gas outflow is shown in FIG. 3. Other gas flow guiding members (not shown) arranged upstream and downstream of the structure 37 guide the primary gas flow to and from the inner and outer gas flow guiding walls 13, 14.

Figure 4:
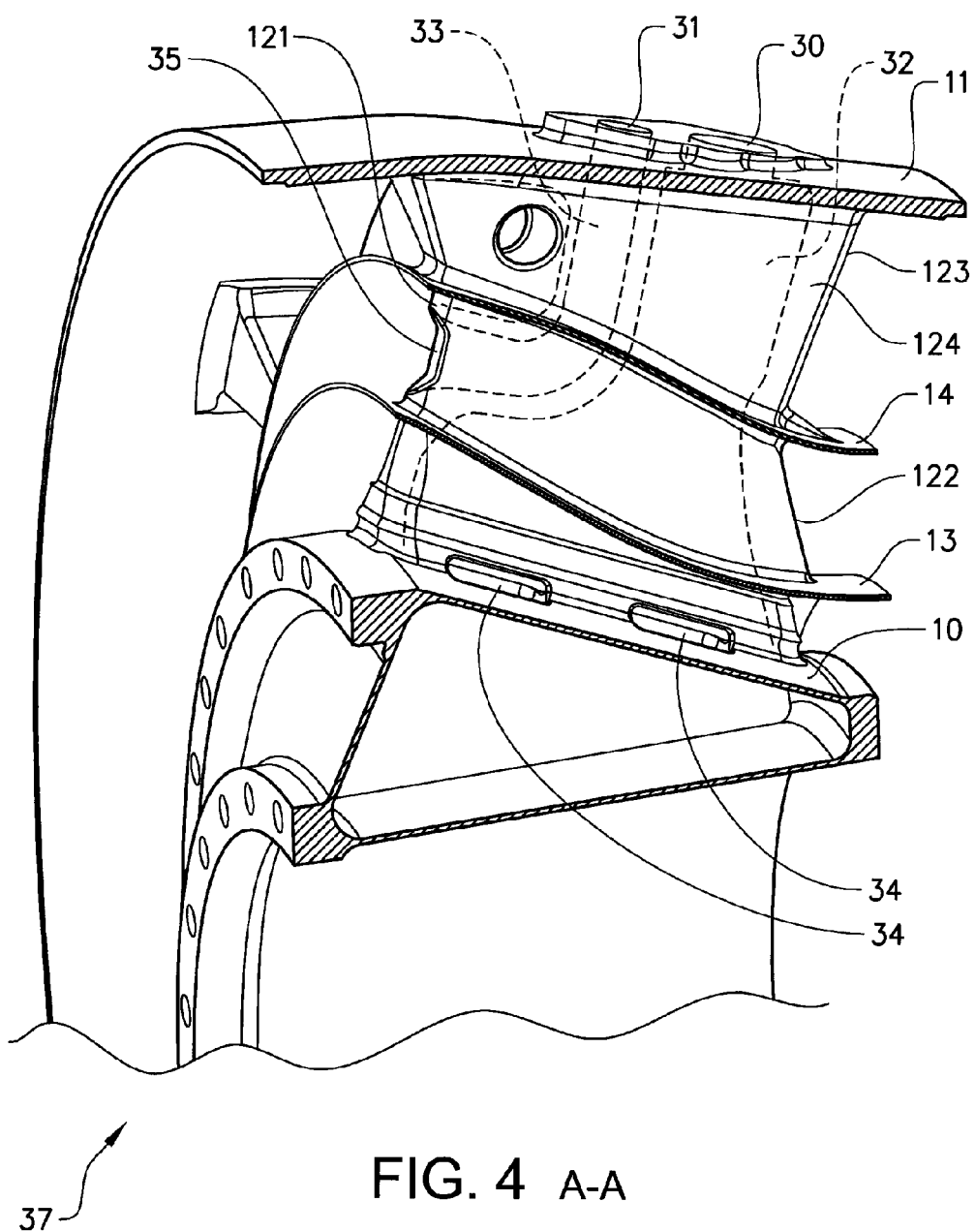
FIG. 4 shows a sectional perspective view A-A according to FIG. 2.

The radial elements/vanes 12 have, at least over a portion of its length located in the gas channel for the primary axial gas flow, an airfoil shape with a leading edge 121 directed towards the inlet side, a trailing edge 122 directed towards the outlet side, and two opposite sides 123, 124 connecting the leading edge 121 and the trailing edge 121 (see FIG. 4). The locus of points midway between the two opposite sides 123, 124 forms a mean camber line of each radial element 12.

Figure 5:
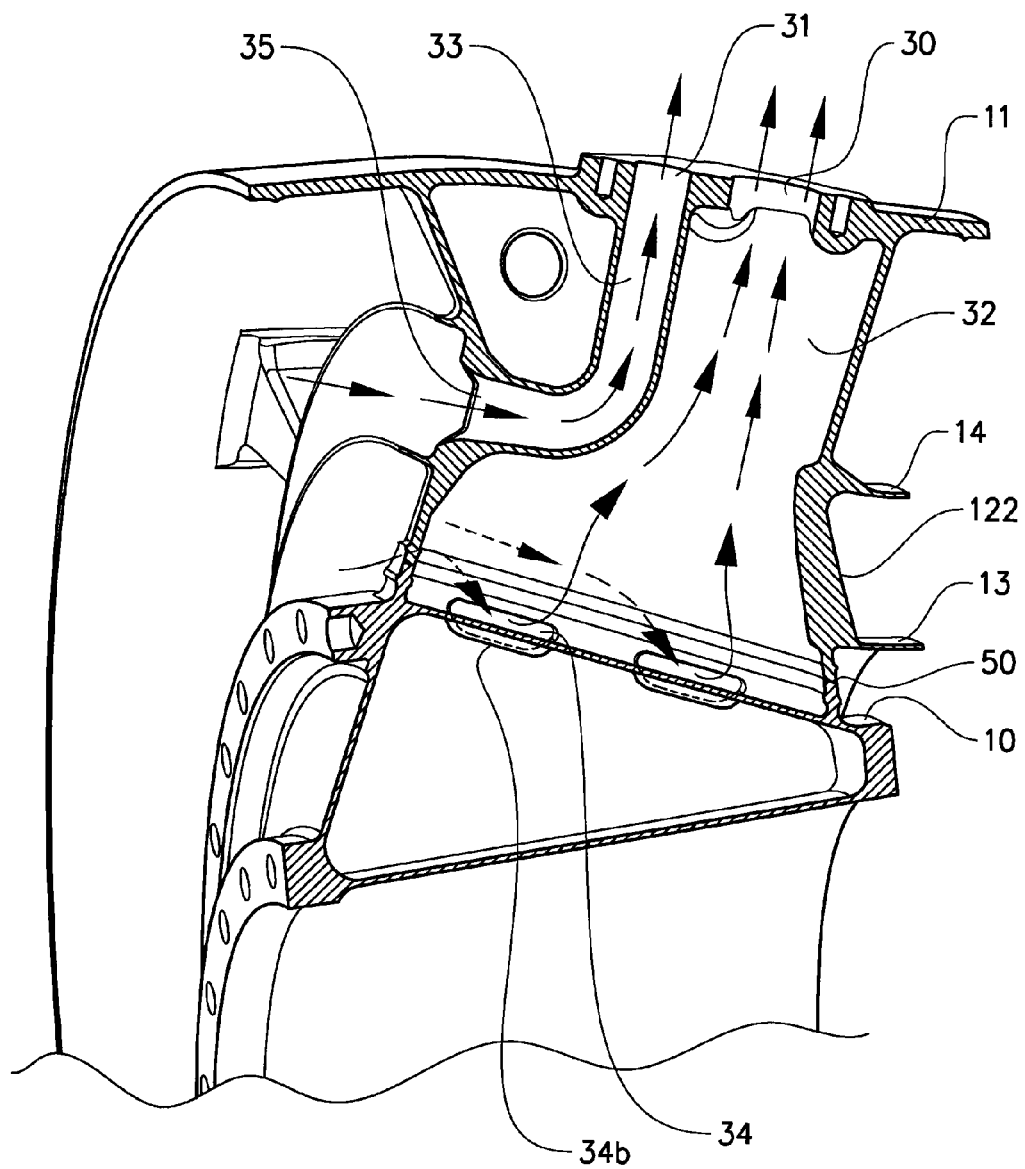
FIG. 5 shows a sectional perspective view B-B according to FIG. 2.
Figure 6:
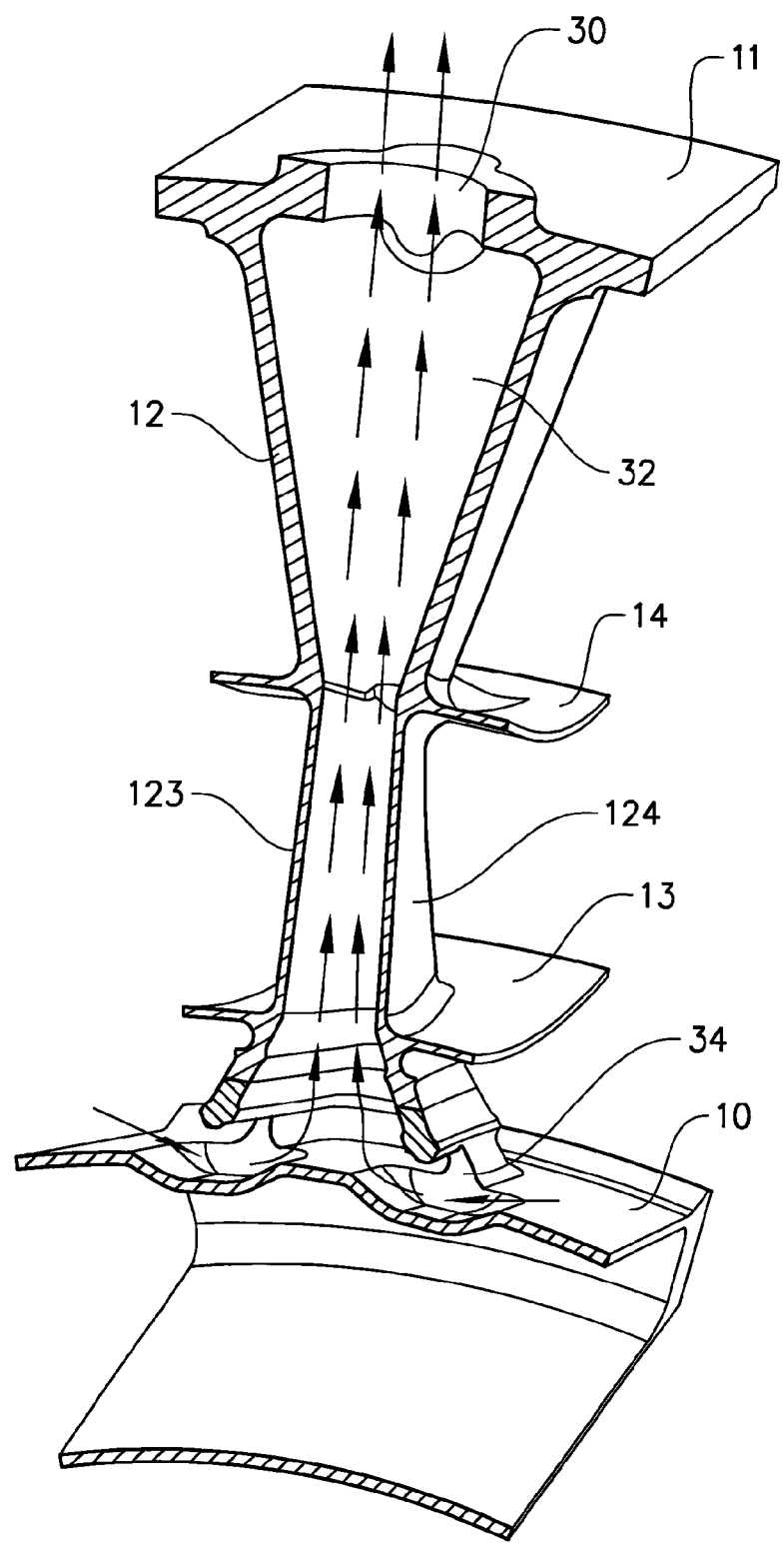
FIG. 6 shows a radial cross section of a part of the embodiment shown in FIGS. 2-5.

As shown in FIGS. 4-6, one of the radial elements 12 comprises a gas passage arrangement configured to lead a separate bleeding gas flow, i.e. separate from the primary axial gas flow, from the supporting structure 37. In the example shown here, the vane 12 actually comprises first and second gas passage arrangements configured to lead first and second separate bleeding gas flows out from the supporting structure 37 via first and second outlets 30, 31 arranged at the outer ring 11 radially outwards of the vane 12. The first and second bleeding gas flows are separated from each other and are used for different purposes.

The first gas passage arrangement comprises a first radially extending bleed gas channel 32 arranged inside the radial element 12 in communication with the first outlet 30. Further, the gas passage arrangement comprises, in this example, four elongated inlet openings 34 in communication with said first bleed gas channel 32, wherein two openings 34 are arranged at each side 123, 124 of the radial element 12.

As can be seen in FIGS. 4-6, the four openings 34 are arranged between the inner ring 10 and the inner annular gas flow guiding member 13 in connection to the inner ring 10, i.e. in an area where the side 124 of the vane 12 meets the inner ring 10. Part of each elongated opening 34 constitutes of a rounded recession 34b (see e.g., FIG. 5) formed in the inner ring 10. All openings 34 have in this case an elongated shape, wherein the longer extension direction of the elongated shape extends along the mean camber 15 line of the radial element 12, i.e. roughly in an axial direction of the supporting structure 37.

All openings 34 are positioned at a certain distance from the leading edge 121 as well as from the trailing edge 122 of the structural vane 12. This is to avoid affecting the mechanical properties too much at the front and rear end parts of the vane 12 which parts carries the major part of the load transferred through the supporting structure 37. The exact value of a minimum distance between the openings 34 and the leading and trailing edges 121, 122 depends on the application. Generally, this minimum distance should be at least 5% of the length of the mean camber line. In many applications at least 10-15% is suitable.

Two openings 34 are arranged at an axial distance from each other on each side 123, 124 of the radial element 12. This axial distance is preferably at least 5% of the length of the mean camber line.

Gas/air present in the space formed between the inner ring 10 and the inner annular gas flow guiding member 13, which gas/air is more or less non-moving and is also clean compared to the primary gas flow, is now in communication with the first outlet 30 and since the pressure of the gas/air present in this space is relatively high it forms a flow of bleeding air through the openings 34 via the gas channel 32 to the outlet 30 and further away. It is possible to use the described design to feed air/gas in the opposite direction.

The supporting structure 37 is in this case produced by welding several prefabricated parts together. One of these parts comprises the inner ring 10 and an inner portion of each of the circumferentially distributed vanes 12. Further parts, such as the inner gas flow guiding wall 13 and extensions of the vanes 12, are joined to this inner part by welding. Each vane 12 therefore has a welding line 50 (see FIG. 5) that extends circumferentially around the vane 12 at a distance from the inner ring 10. As can be seen in the figures the openings 34 are arranged between the welding line 50 and the inner ring 10 as far away as reasonably possible from the welding line 50. Thus, the distance to the welding line 50 is maximized and the structural effects minimized.

As mentioned above, the vane 12 comprises a second gas passage arrangement configured to lead a second separate bleeding gas flow from the supporting structure 37 via the second outlet 31. The second gas passage arrangement comprises a second radially extending bleed gas channel 33 arranged inside the radial element 12 and a second inlet opening 35 in communication with the second outlet 31 via said second bleed gas channel 33. The second inlet opening 35 is arranged at the leading edge 121 of the vane 12 in the gas channel for the primary axial gas flow. Accordingly, the second inlet opening 35 is in this case arranged between the inner and outer gas flow guiding members 13, 14.

The second bleeding gas flow can, for instance, be used for buffering a bearing house of a supporting structure in the high pressure turbine section of the gas turbine engine.

The second gas passage arrangement, and in particular the design close to the leading edge 121, is optimized and balanced to give the radial element 12 high strength and stiffness, to provide for a favourable second bleeding gas flow (low pressure drop etc.), and to give a low weight.

Arrows in FIGS. 5-6 indicate the flow of the two separate bleeding gas flows from the supporting structure 37.

The invention is not limited by the embodiments described above but can be modified in various ways within the scope of the claims. For instance, the flow of bleeding gas can be fed to other parts of the engine or to locations outside of the engine and it is not necessary to include the second gas passage arrangement. Further, it is not necessary that two openings 34 of the first gas passage arrangement are arranged on each side of the vane 12.

As indicated in FIG. 2 only one of the radial elements 12 is provided with the gas passage arrangements. However, one or several elements 12 can include the first gas passage arrangements and optionally also the second arrangement.

The invention claimed is:

1. A supporting structure for a gas turbine engine, said structure comprising:
   an inner ring,
   an outer ring,
   a plurality of circumferentially spaced, load carrying radial elements connecting the inner and outer rings, said radial elements being configured to transfer loads between the inner ring and the outer ring, wherein a gas channel for a primary axial gas flow is defined between the inner and outer rinds,
   an inlet side for primary gas flow entrance, and
   an outlet side for primary gas outflow,
   wherein the radial elements have an airfoil shape with a leading edge directed towards the inlet side of the supporting structure, a trailing edge directed towards the outlet side of the supporting structure, and two opposite sides connecting the leading edge and the trailing edge, wherein a locus of points midway between the two opposite sides forms a mean camber line of each radial element,
   wherein at least one of the radial elements comprises a gas passage arrangement configured to lead a separate bleeding gas flow from a compressor of the gas turbine engine through the supporting structure,
   wherein the gas passage arrangement comprises a radially extending gas channel arranged inside the radial element and at least two openings in communication with said gas channel, wherein the at least two openings are arranged at a meeting point of the two opposite sides and the inner ring with a first opening of the at least two openings being located on a first side of the two opposite sides of the radial element and a second opening of the at least two openings being located on a second side of the two opposite sides,
   wherein the at least two openings have an elongated shape, and a longer extension direction of the elongated shape extends along the mean camber line of the radial element, and
   wherein the at least two openings form apertures through or form recesses in the inner ring.

2. The supporting structure according to claim 1, further comprising an inner annular gas flow guiding member configured to define an inner radius for the primary axial gas flow, wherein the inner annular gas flow guiding member is arranged radially outwards of the inner ring, and wherein the at least two openings are arranged between the inner ring and the inner annular gas flow guiding member.

3. The supporting structure according to claim 1, wherein the at least two openings comprise a recession formed in the inner ring.

4. The supporting structure according to claim 1, wherein the at least two openings are positioned at a certain minimum distance from the leading edge as well as from the trailing edge, wherein said minimum distance is 5% of a length of the mean camber line.

5. The supporting structure according to claim 1, wherein the gas channel is in communication with at least four openings arranged on opposite sides of the radial element.

6. The supporting structure according to claim 5, wherein two of the four openings are arranged at an axial distance from each other on each side of the radial element, wherein each of the two openings has an elongated shape, and a longer extension direction of the elongated shape extends along the mean camber line of the radial element.

7. The supporting structure according to claim 1, wherein the structure is produced by welding at least two parts together, wherein the at least one radial element has a welding line that extends circumferentially around the radial element at a distance from the inner ring.

8. The supporting structure according to claim 7, wherein the at least two openings are arranged between the welding line and the inner ring.

9. The supporting structure according to claim 1, wherein the at least one radial element comprises a second gas passage arrangement configured to lead a second separate bleeding gas flow from the supporting structure, wherein the second gas passage arrangement comprises a second radially extending gas channel arranged inside the radial element and at least one second opening in communication with said second gas channel, wherein the at least one second opening is arranged at the leading edge of the radial element.

10. A gas turbine engine comprising a compressor section, a fuel combustion chamber, a turbine section and a supporting structure,
    wherein the supporting structure comprises:
    an inner ring,
    an outer ring,
    a plurality of circumferentially spaced, load carrying radial elements connecting the inner and outer rings, said radial elements being configured to transfer loads between the inner ring and the outer ring, wherein a gas channel for a primary axial gas flow is defined between the inner and outer rings,
    an inlet side for primary gas flow entrance, and
    an outlet side for primary gas outflow,
    wherein the radial elements have an airfoil shape with a leading edge directed towards the inlet side of the supporting structure, a trailing edge directed towards the outlet side of the supporting structure, and two opposite sides connecting the leading edge and the trailing edge, wherein a locus of points midway between the two opposite sides forms a mean camber line of each radial element,
    wherein at least one of the radial elements comprises a gas passage arrangement configured to lead a separate bleeding gas flow from the supporting structure,
    wherein the gas passage arrangement comprises a radially extending gas channel arranged inside the radial element and at least two openings in communication with said gas channel, wherein the at least two openings are arranged at a meeting point of the two opposite sides and the inner ring with a first opening of the at least two openings being located on a first side of the two opposite sides of the radial element and a second opening of the at least two openings being located on a second side of the two opposite sides,
    wherein the at least two openings have an elongated shape, and a longer extension direction of the elongated shape extends along the mean camber line of the radial element, and
    wherein the at least two openings form apertures through or form recesses in the inner ring.

11. The gas turbine engine according to claim 10, wherein the gas turbine engine is of an axial flow type comprising in flow series the compressor section, the fuel combustion chamber, and the turbine section, wherein the supporting structure is arranged in the compressor section.

12. The gas turbine engine according to claim 10, wherein the gas turbine engine is arranged for propulsion of an aircraft.

\* \* \* \* \*